US008699715B1

(12) United States Patent
Juels et al.

(10) Patent No.: US 8,699,715 B1
(45) Date of Patent: Apr. 15, 2014

(54) ON-DEMAND PROACTIVE EPOCH CONTROL FOR CRYPTOGRAPHIC DEVICES

(75) Inventors: Ari Juels, Brookline, MA (US); John G. Brainard, Sudbury, MA (US); Robert Damon Hopley, Fitchburg, MA (US)

(73) Assignee: EMC Corporation, Hopkinton, MA (US)

( * ) Notice: Subject to any disclaimer, the term of this patent is extended or adjusted under 35 U.S.C. 154(b) by 45 days.

(21) Appl. No.: 13/431,193

(22) Filed: Mar. 27, 2012

(51) Int. Cl.
H04L 29/06 (2006.01)

(52) U.S. Cl.
USPC .......................................... 380/278; 713/159

(58) Field of Classification Search
USPC ......... 713/159, 152, 172, 171, 176, 177, 187, 713/185, 189, 186, 164, 169; 380/278
See application file for complete search history.

(56) References Cited

U.S. PATENT DOCUMENTS

| 4,720,860 | A | | 1/1988 | Weiss |
| 5,168,520 | A | | 12/1992 | Weiss |
| 5,361,062 | A | | 11/1994 | Weiss et al. |
| 5,623,546 | A | * | 4/1997 | Hardy et al. ................ 713/193 |
| 5,825,880 | A | * | 10/1998 | Sudia et al. ................ 713/180 |
| 6,587,946 | B1 | * | 7/2003 | Jakobsson .................. 713/180 |
| 6,909,786 | B2 | * | 6/2005 | Ng et al. .................... 380/286 |
| 6,965,674 | B2 | * | 11/2005 | Whelan et al. ............. 380/270 |
| 6,978,017 | B2 | * | 12/2005 | Wiener et al. ................ 380/30 |
| 6,986,049 | B2 | * | 1/2006 | Delany ....................... 713/176 |
| 7,003,110 | B1 | * | 2/2006 | Jakobsson et al. ............ 380/45 |
| 7,017,046 | B2 | * | 3/2006 | Doyle et al. ............... 713/178 |
| 7,133,526 | B2 | * | 11/2006 | Whelan et al. ............. 380/270 |
| 7,210,035 | B2 | * | 4/2007 | Doyle et al. ............... 713/157 |
| 7,353,541 | B1 | * | 4/2008 | Ishibashi et al. ............. 726/26 |
| 7,433,474 | B2 | * | 10/2008 | Kato et al. ................. 380/284 |
| 7,477,738 | B2 | * | 1/2009 | Rajamma ..................... 380/44 |
| 7,571,471 | B2 | * | 8/2009 | Sandhu et al. ................ 726/17 |
| 7,577,888 | B2 | * | 8/2009 | Sudhakar et al. .......... 714/732 |
| 7,590,247 | B1 | * | 9/2009 | Dinsmore et al. .......... 380/278 |
| 7,643,636 | B2 | * | 1/2010 | Kruegel ..................... 380/264 |
| 7,657,751 | B2 | * | 2/2010 | Micali et al. ............... 713/176 |
| 7,734,045 | B2 | * | 6/2010 | Sandhu et al. ................ 380/44 |
| 7,734,911 | B2 | * | 6/2010 | Ganesan et al. ............ 713/155 |
| 7,734,912 | B2 | * | 6/2010 | Ganesan et al. ............ 713/155 |

(Continued)

OTHER PUBLICATIONS

M. Bellare et al., "A Forward-Secure Digital Signature Scheme," Advances in Cryptology (CRYPTO), Lecture Notes in Computer Science (LNCS), Aug. 1999, pp. 431-448, vol. 1666.

(Continued)

*Primary Examiner* — David Garcia Cervetti
(74) *Attorney, Agent, or Firm* — Ryan, Mason & Lewis, LLP

(57) ABSTRACT

A first cryptographic device is configured to store secret information that is refreshed in each of a plurality of epochs. The first cryptographic device receives an epoch control signal, and adjusts at least one epoch responsive to the received epoch control signal. Refreshed secret information associated with an adjusted epoch is utilized to authenticate the first cryptographic device to at least a second cryptographic device, where the second cryptographic device and one or more additional cryptographic devices store respective portions of the secret information in a distributed manner. By way of example, the epoch control signal may comprise an epoch advance signal directing that the first cryptographic device advance from a current one of the epochs to a subsequent one of the epochs. In an illustrative embodiment, the first cryptographic device comprises an authentication token and the second cryptographic device comprises an authentication server.

20 Claims, 4 Drawing Sheets

(56) References Cited

U.S. PATENT DOCUMENTS

| | | | |
|---|---|---|---|
| 7,818,519 B2* | 10/2010 | Plunkett | 711/158 |
| 7,895,437 B2* | 2/2011 | Ganesan et al. | 713/171 |
| 7,936,878 B2* | 5/2011 | Kune et al. | 380/270 |
| 8,045,713 B2* | 10/2011 | Lain et al. | 380/277 |
| 8,099,607 B2* | 1/2012 | Sandhu et al. | 713/189 |
| 8,139,767 B2* | 3/2012 | Camenisch et al. | 380/44 |
| 8,327,149 B2* | 12/2012 | Micali et al. | 713/176 |
| 8,340,287 B2* | 12/2012 | Sandhu et al. | 380/44 |
| 8,364,967 B2* | 1/2013 | Sudia et al. | 713/180 |
| 8,407,475 B2* | 3/2013 | Ganesan et al. | 713/171 |
| 8,416,802 B2* | 4/2013 | Jin et al. | 370/464 |
| 8,452,011 B2* | 5/2013 | Guo et al. | 380/241 |
| 2002/0013898 A1* | 1/2002 | Sudia et al. | 713/155 |
| 2002/0129241 A1* | 9/2002 | Doyle et al. | 713/157 |
| 2003/0110376 A1* | 6/2003 | Wiener et al. | 713/158 |
| 2003/0219129 A1* | 11/2003 | Whelan et al. | 380/270 |
| 2004/0237031 A1* | 11/2004 | Micali et al. | 715/511 |
| 2005/0018853 A1* | 1/2005 | Lain et al. | 380/277 |
| 2005/0039017 A1* | 2/2005 | Delany | 713/176 |
| 2005/0047598 A1* | 3/2005 | Kruegel | 380/264 |
| 2005/0180568 A1* | 8/2005 | Krause | 380/212 |
| 2005/0204129 A1* | 9/2005 | Sudia et al. | 713/158 |
| 2006/0078124 A1* | 4/2006 | Whelan et al. | 380/273 |
| 2006/0136719 A1* | 6/2006 | Doyle et al. | 713/157 |
| 2006/0233364 A1* | 10/2006 | Camenisch | 380/44 |
| 2007/0014400 A1* | 1/2007 | Wack et al. | 380/44 |
| 2007/0033392 A1* | 2/2007 | Ganesan et al. | 713/155 |
| 2007/0033393 A1* | 2/2007 | Ganesan et al. | 713/155 |
| 2007/0033642 A1* | 2/2007 | Ganesan et al. | 726/10 |
| 2007/0055878 A1* | 3/2007 | Sandhu et al. | 713/171 |
| 2007/0067618 A1* | 3/2007 | Sandhu et al. | 713/155 |
| 2007/0101126 A1* | 5/2007 | Choi et al. | 713/156 |
| 2007/0140481 A1* | 6/2007 | Parameswaran Rajamma | 380/37 |
| 2007/0186095 A1* | 8/2007 | Ganesan et al. | 713/155 |
| 2007/0248232 A1* | 10/2007 | Driscoll et al. | 380/280 |
| 2007/0258594 A1* | 11/2007 | Sandhu et al. | 380/277 |
| 2008/0130902 A1* | 6/2008 | Foo Kune et al. | 380/286 |
| 2008/0235517 A1* | 9/2008 | Ohmori et al. | 713/187 |
| 2009/0006852 A1* | 1/2009 | Qiu et al. | 713/176 |
| 2009/0217034 A1* | 8/2009 | Sudia et al. | 713/156 |
| 2009/0316886 A1* | 12/2009 | Camenisch et al. | 380/44 |
| 2010/0104103 A1* | 4/2010 | Guo et al. | 380/278 |
| 2010/0268956 A1* | 10/2010 | Micali et al. | 713/176 |
| 2011/0099379 A1* | 4/2011 | Ganesan et al. | 713/175 |
| 2011/0116628 A1* | 5/2011 | Wack et al. | 380/44 |
| 2011/0314072 A1* | 12/2011 | Resch et al. | 707/827 |
| 2012/0123981 A1* | 5/2012 | Graves et al. | 706/13 |
| 2012/0131139 A1* | 5/2012 | Siripurapu et al. | 709/217 |
| 2012/0166576 A1* | 6/2012 | Orsini et al. | 709/217 |
| 2012/0170751 A1* | 7/2012 | Wurm | 380/278 |
| 2012/0210135 A1* | 8/2012 | Panchapakesan et al. | 713/172 |
| 2012/0243683 A1* | 9/2012 | Oba et al. | 380/255 |
| 2013/0090134 A1* | 4/2013 | Heshmati | 455/456.3 |
| 2013/0243195 A1* | 9/2013 | Kruegel et al. | 380/270 |

OTHER PUBLICATIONS

R. Canetti et al., "Proactive Security: Long-Term Protection Against Break-Ins," RSA CryptoBytes, Spring 1997, pp. 1-16, vol. 3, No. 1.

R. Canetti et al., "Maintaining Security in the Presence of Transient Faults," Advances in Cryptology (CRYPTO), Aug. 1994, pp. 425-438.

R. Ostrovsky et al., "How to Withstand Mobile Virus Attacks (Extended Abstract)," 10th annual ACM Symposium on Principles of Distributed Computing (PODC), Aug. 1991, pp. 51-59.

Victor Shoup, "Practical Threshold Signatures," Advances in Cryptology (CRYPTO), Lecture Notes in Computer Science (LNCS), May 2000, pp. 207-220, vol. 1807.

A.J. Menezes et al., "Handbook of Applied Cryptography," CRC Press, Oct. 1996, 794 pages.

S Xu et al., "SocialClouds: Concept, Security Architecture and Some Mechanisms," Trusted Systems, Lecture Notes in Computer Science (LNCS), 2010, pp. 104-128, vol. 6163.

\* cited by examiner

ON-DEMAND PROACTIVE EPOCH CONTROL FOR CRYPTOGRAPHIC DEVICES

FIELD

The field relates generally to cryptography, and more particularly to authentication techniques implemented using cryptographic devices.

BACKGROUND

Cryptographic devices include, by way of example, one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In such tokens, the passcodes are wirelessly communicated to a computer or other element of an authentication system. These wired or wireless arrangements, also referred to herein as connected tokens, save the user the trouble of reading the passcode from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

Many authentication systems are configured to require that a user enter a personal identification number (PIN) or other static access code in addition to entering the passcode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

Authentication tokens and other OTP devices are typically programmed with a random seed or other type of key that is also stored in a token record file. The record file is loaded into an authentication server, such that the server can create matching passcodes for the authentication token based on the key and the current time or current event count. When the user first activates the token, the server stores the user PIN in association with the key corresponding to that token.

An adversary possessing a stolen record file is able to generate correct passcodes for each token key stored in that file. In order to impersonate a particular user, the adversary would generally have to "phish" or otherwise obtain access to the details of at least one user login session such that it learns the user PIN as well as one passcode that can be matched to one of the token keys in the record file.

Security issues such as these can be addressed through the use of unidirectional or broadcast key updates. In this manner, the key associated with a particular authentication token is periodically refreshed or otherwise updated.

However, even in strongly-defended systems, intrusions are becoming inevitable due to the increasing sophistication of advanced persistent threats (APTs). APTs are usually mounted by well-funded attackers with very specific targets. To accomplish their goals, attackers orchestrating an APT typically introduce periods of delay among different stages of the attack, advance slowly while keeping their footprint low, and control the propagation of the attack through the use of human operators. Due to these and other threats, the approach of trying to build impenetrable systems is proving unworkable. Instead, secure systems need to be architected in an intrusion-resilient way.

Proactive cryptography can be used to create resilience against continuous adversarial compromise. In one type of proactive system, shares of a secret key sk are distributed among multiple servers. These servers collaboratively refresh their shares on a periodic basis, that is, they randomly redistribute sk. Thus, while sk itself remains invariant, servers can "heal" after compromise, in the sense that a key share exposed to an adversary is ultimately invalidated by a refresh operation. The refresh operations are performed at the start of respective time periods. Such time periods are examples of what more generally referred to herein as "epochs." Epochs in conventional proactive authentication systems are typically fixed-length intervals.

Additional details regarding conventional proactive systems of the type described above can be found in, for example, R. Ostrovsky and M. Yung, "How to withstand mobile virus attacks," Proceedings of the 10th annual ACM symposium on Principles of Distributed Computing, PODC '91, pp. 51-59, New York, N.Y., USA, 1991, and R. Canetti, R. Gennaro and A. Herzberg, "Proactive security: Long-term protection against break-ins," CryptoBytes, Vol. 3, pp. 1-8, 1997, which are incorporated by reference herein.

Another type of proactive system is an intrusion-resistant distributed pseudorandom number generation system. In a system of this type, a set of servers holds a pseudorandom value that is updated at the beginning of every epoch. A corresponding authentication token can locally generate the value in a given period to authenticate to the servers. See R. Canetti and A. Herzberg, "Maintaining security in the presence of transient faults," CRYPTO, pp. 425-438, 1994, which is incorporated by reference herein.

Proactive cryptography generally aims to provide protection even in cases where a breach goes undetected. However, a proactive system may be configured to accelerate the refresh process upon the detection of a breach. See, for example, S. Xu, M. Yung, and L. Chen, "SocialClouds: Concept, Security Architecture and Some Mechanisms," Vol. 6163, pp. 104-128, Springer Berlin/Heidelberg, 2010, which is incorporated by reference herein. One drawback of an arrangement of this type is that it is generally not appropriate for use with hardware authentication tokens or other similar cryptographic devices, such as software authentication tokens implemented in a mobile telephone.

SUMMARY

One or more illustrative embodiments of the present invention provide authentication techniques that support on-demand proactivation for hardware and software authentication tokens as well as other types of cryptographic devices.

In one embodiment, a first cryptographic device is configured to store secret information that is refreshed in each of a plurality of epochs. The first cryptographic device receives an epoch control signal, and adjusts at least one epoch responsive to the received epoch control signal. Refreshed secret information associated with an adjusted epoch is utilized to authenticate the first cryptographic device to at least a second cryptographic device, where the second cryptographic device and one or more additional cryptographic devices store respective portions of the secret information in a distributed manner.

By way of example, the epoch control signal may comprise an epoch advance signal directing that the first cryptographic device advance from a current one of the epochs to a subsequent one of the epochs prior to a time at which the first cryptographic device would otherwise advance to the subsequent epoch.

The first cryptographic device may illustratively comprise an authentication token and the second cryptographic device may illustratively comprise an authentication server.

In an embodiment in which the first cryptographic device comprises a hardware authentication token, the epoch control signal may be received responsive to activation of a designated user input button or other epoch control input mechanism of the hardware authentication token. The hardware authentication token may be further configured to recognize only a single activation of the epoch control input mechanism within a specified period of time, so as to avoid inadvertent user activations of the mechanism.

In an embodiment in which the first cryptographic device comprises a software authentication token, the epoch control signal may be received in the form of a digitally-signed message jointly produced by a plurality of servers, one of which comprises the second cryptographic device. The digitally-signed message may indicate the current epoch, and the message may be rejected by the first cryptographic device if the message is not received within the current epoch.

The illustrative embodiments advantageously overcome the drawbacks of conventional techniques, by providing authentication techniques that allow improved epoch control for hardware and software authentication tokens and other types of cryptographic devices in the presence of detected breaches or other security issues.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as encompass not only authentication tokens but also other types of devices that can provide or process epoch control information in the manner disclosed herein. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides authentication techniques which support on-demand proactivation for authentication tokens and other types of cryptographic devices.

Figure 1:
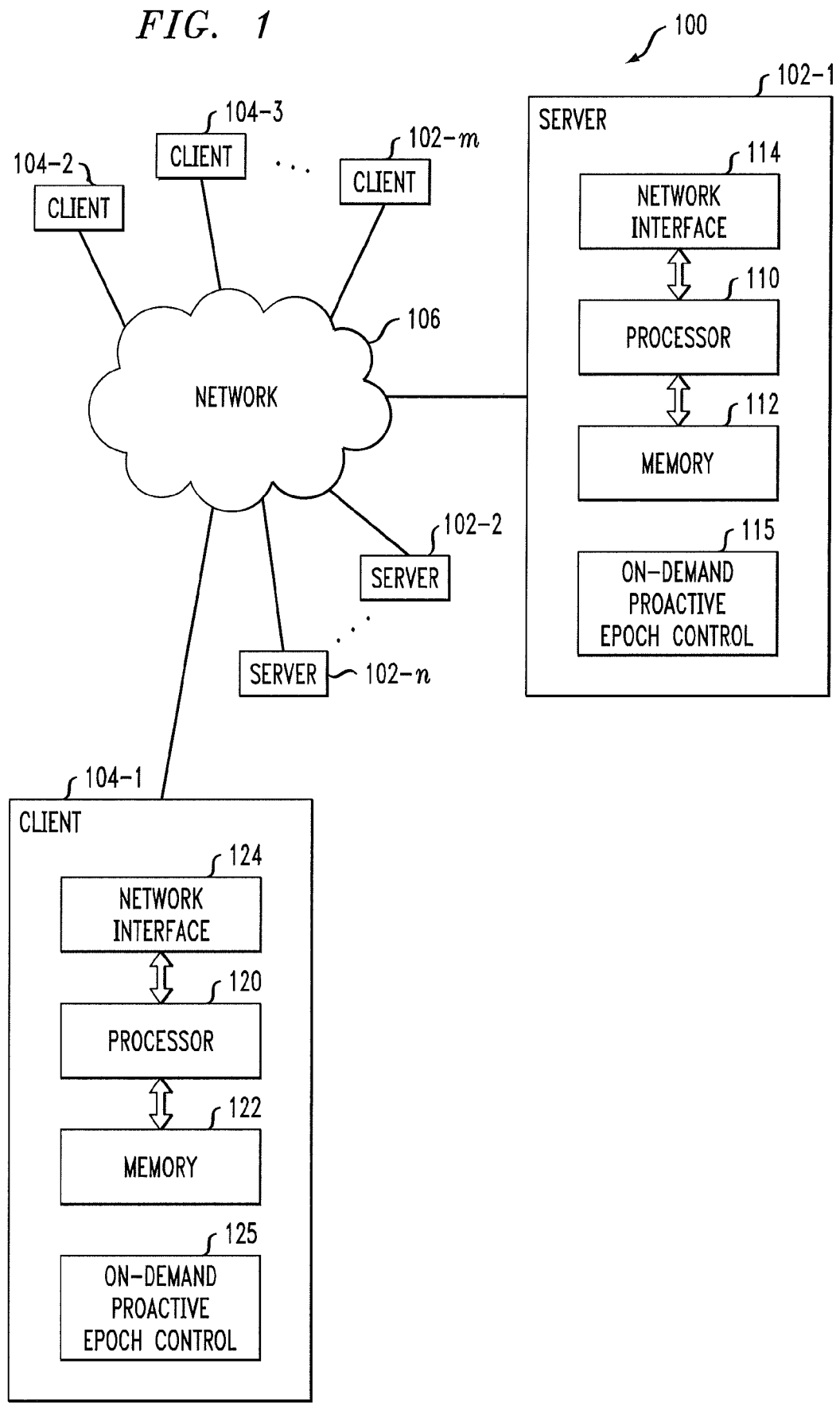
FIG. 1 is a block diagram of a communication system with on-demand proactivation functionality in an illustrative embodiment of the invention.

FIG. 1 shows a communication system 100 that incorporates on-demand proactivation functionality in an illustrative embodiment. The system 100 comprises a plurality of servers 102-1, 102-2, . . . 102-n that are configured to communicate with a plurality of clients 104-1, 104-2, . . . 104-m, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for on-demand proactivation. An example of such a process performed by a given one of the clients 104 in order to authenticate to one or more of the servers 102 will be described in conjunction with FIG. 2, but it is to be appreciated that numerous other types of processes may be used in other embodiments.

A given one of the servers 102-1 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102-1 is network interface circuitry 114. The network interface circuitry 114 allows the server 102-1 to communicate over the network 106 with the other servers 102 and with the clients 104, and may comprise one or more conventional transceivers.

The server 102-1 further includes an on-demand proactive epoch control module 115. This module may be implemented at least in part in the form of software that is stored in memory 112 and executed by processor 110.

The other servers 102 of the system 100 are assumed to be configured in a manner similar to that shown for server 102-1 in the figure.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the servers 102 and with the other clients 104, and may comprise one or more conventional transceivers.

The client 104-1 further includes an on-demand proactive epoch control module 125. This module may be implemented at least in part in the form of software that is stored in memory 122 and executed by processor 120.

The other clients 104 of the system 100 are assumed to be configured in a manner similar to that shown for client 104-1 in the figure.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The communication system 100 as shown in FIG. 1 is configured to allow a first cryptographic device, such as a given one of the clients 104, to authenticate itself to at least a second cryptographic device, such as one or more of the servers 102, using a secret value associated with the first cryptographic device. The communication system 100 and other similar systems herein are therefore also referred to as authentication systems. The secret value may comprise a seed or other key stored in the first cryptographic device that is refreshed in each of a plurality of epochs. The epochs may comprise, for example, respective time intervals. However, the term "epoch" as used herein is intended to be broadly construed so as to also encompass event-based epochs of various types.

In operation, the first cryptographic device receives an epoch control signal and adjusts at least one epoch device responsive to the received epoch control signal. For example, the first cryptographic device may receive an epoch advance signal directing that the first cryptographic device advance from a current one of the epochs to a subsequent one of the epochs. In response to receiving such an epoch advance signal, the first cryptographic device terminates the current epoch and advances to the subsequent epoch, prior to a time at which the first cryptographic device would otherwise advance to the subsequent epoch absent receipt of the epoch advance signal. Such an epoch advance signal may be generated responsive to an indication of potential compromise of the secret value or other type of security issue within the system 100.

Accordingly, the current epoch is terminated prematurely by the first cryptographic device, responsive to receipt of the epoch advance signal, prior to a time that it would ordinarily terminate absent receipt of the epoch advance signal. Other types of epoch adjustment may be performed responsive to epoch control signals in other embodiments.

The first cryptographic device utilizes refreshed secret information associated with an adjusted epoch to authenticate itself to at least the second cryptographic device. It is assumed in the context of such an embodiment that the second cryptographic device and one or more additional cryptographic devices store respective portions of the secret information in a distributed manner. For example, the second cryptographic device and the additional cryptographic devices may comprise the n servers 102 of FIG. 1, each storing a different portion of a seed or other key utilized by the first cryptographic device corresponding to a given one of the clients 104. The term "distributed" in this context is intended to be broadly construed so as encompass arrangements in which portions of a secret value are held by multiple servers or other cryptographic devices in a threshold manner.

It is to be appreciated that the particular set of elements shown in FIG. 1 for providing on-demand proactivation is presented by way of example, and in other embodiments additional or alternative elements may be used. Thus, another embodiment may include additional networks and additional sets of clients or servers.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

As noted above, in one or more of illustrative embodiments, the first cryptographic device and the second cryptographic device may comprise an authentication token and an authentication server, respectively.

Figure 2:
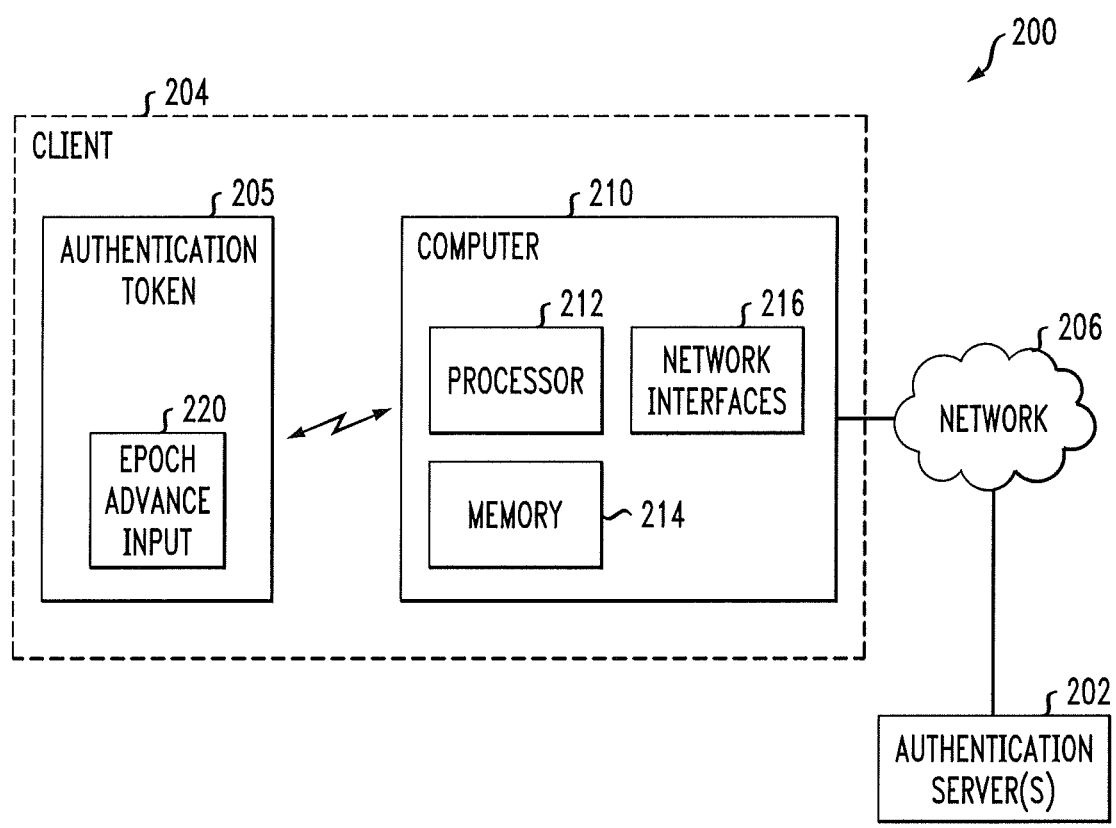
FIG. 2 shows one possible implementation of the FIG. 1 system including an authentication token and an authentication server in an illustrative embodiment of the invention.

FIG. 2 shows an example of an authentication system 200 corresponding generally to an implementation of communication system 100 in which one or more authentication servers 202 authenticate a client 204 that comprises an authentication token 205. Information from the authentication token 205 is sent to a given authentication server 204 via network 206 and a host device 210 that illustratively comprises a computer. As indicated previously, the term "cryptographic device" as used herein is intended to be broadly construed so as to encompass, for example, authentication token 205 alone or in combination with at least a portion of the computer 210. In other embodiments, such as those involving use of software tokens, the first cryptographic device may comprise only computer 210, or another type of processing device, such as a mobile telephone.

The authentication token 205 is configured to generate OTPs or other passcodes using the techniques disclosed herein. Such passcodes may be presented to a user via a display of the token, such that the user can manually enter a given passcodes into a user interface of the host device 210. Alternatively, a given passcode may be communicated directly from the authentication token 205 via a wired or wireless connection between the token and the host device 210. By way of example, the authentication token may be configured to communicate with the host device 210 via a wired connection such as a USB interface, or via a wireless connection such as a Bluetooth or IEEE 802.11 connection.

The authentication token 205 may be, for example, a time-synchronous authentication token, an event-synchronous authentication token, a challenge-response token, a hash-chain token, or a hybrid token that incorporates multiple such capabilities, such as a hybrid time-synchronous and event-synchronous token. A given authentication token may be a connected token or a disconnected token, or one capable of operating in both connected and disconnected modes. The disclosed techniques can be adapted in a straightforward manner for use with other types of authentication devices, or more generally cryptographic devices.

As a more particular example, the authentication token 205 may comprise a time-synchronous authentication token such as the above-noted RSA SecurID® user authentication token, suitably modified as disclosed herein.

The authentication token 205 in the present embodiment further comprises an epoch advance input 220, activation of which may be used to generate an epoch advance signal in the authentication token. As indicated previously, such a signal causes the authentication token to terminate a current epoch and advances to a subsequent epoch, thereby terminating the current epoch prematurely, and may be generated responsive to an indication of potential compromise of the secret value or other type of security issue.

The epoch advance input 220 is an example of what is more generally referred to herein as an "epoch control input mechanism" of the authentication token 205. Such a mechanism may comprise, for example, a designated user input button of the authentication token, which may be implemented as a separate physical button, as a soft-key, as a touch-sensitive display, or using other arrangements. Existing buttons or other input mechanisms of a given hardware authentication token used for transaction inputs or to prompt passcode generation may be adapted for use for epoch control inputs.

Activation of the epoch control input mechanism causes an epoch control signal to be generated within the authentication token 205. Therefore, the authentication token in the present embodiment receives the epoch control signal responsive to activation of the epoch control input mechanism. In other embodiments, an epoch control signal may be received by the authentication token from another system entity, such as from a given authentication server 202 or computer 210.

The epoch advance input 220 may be configured so as to prevent inadvertent excessive actuation by a user. For example, it may be configured such that only a single activation of the epoch advance input will be accepted within a specified period of time, such as an hour. Alternatively, a prolonged button depression or simultaneous depression of multiple buttons may be required for this purpose.

The host device 210 may comprise a desktop or portable personal computer, mobile telephone, personal digital assistant (PDA), wireless email device, workstation, kiosk, television set-top box, game console, or any other processing device that provides an interface between authentication token 205 and a given authentication server 202.

As shown in the figure, the host device 210 generally comprises a processor 212, a memory 214, and one or more network interfaces 216 which allow the device to communicate with a given authentication server 202 over the network 206.

It should also be noted that a given authentication token need not take the form of a stand-alone hardware token. For example, such a device may be incorporated into another processing device, such as a computer, mobile telephone, etc. In one such implementation, the host device and the authentication token may be combined into a single processing device that communicates with the authentication server.

In the system 200, the authentication server 202 is configured as a back-end authentication server, in that it communicates with host device 210 over a network, but other types of authentication servers may be used.

A wide variety of authentication processes may be implemented using an authentication token 205, authentication server 202 and host device 210 arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

It is to be appreciated that a given embodiment of the system 200 may include multiple instances of authentication token 205, authentication server 202 and host device 210, and possibly other system components, although only single instances of such components are shown in the simplified system diagram of FIG. 2 for clarity of illustration. Also, as indicated previously, other embodiments may combine certain system elements, such as the authentication token and the host device. It is also possible to eliminate, modify or replace other system elements. For example, authentication token 205 may communicate directly with authentication server 202, rather than via other elements such as host device 210 and network 206.

The operation of the systems 100 and 200 will now be described in greater detail with reference to the flow diagram of FIG. 3, which illustrates a set of operations performed by a given client 104-1 or 204 in an illustrative embodiment. The given client is referred to in the context of the FIG. 3 flow diagram as a first cryptographic device and a given server 102 or 202 is referred to as a second cryptographic device.

The process as shown includes steps 300, 302 and 304, which are assumed to be performed by the given client 104-1 or 204, although in other embodiments one or more such steps may be implemented at least in part by other system elements.

In step 300, the first cryptographic device receives an epoch control signal. It is assumed that the first cryptographic device is configured to store a seed, key or other secret information that is refreshed in each of multiple sequential epochs. It is further assumed that the second cryptographic device and one or more additional cryptographic devices store respective portions of the secret information in a distributed manner.

The system 100 or 200 in this embodiment may therefore be configured as a proactive symmetric-key authentication system with n servers. As an example of such a system, let $k_t^{(i)}$ denote the secret key state of server i in epoch t. Let f denote an authentication value derivation function $$f: \{k_t^{(i)}\}_{i=1}^n \to \kappa_t.$$

Then $\kappa_t$ is the client authentication value for epoch t, used for authentication to the servers. An update function $$g: \{k_t^{(i)}\}_{i=1}^n \to \{k_{t+1}^{(i)}\}_{i=1}^n$$

is ordinarily applied locally by the client and in a distributed manner by the servers at the beginning of epoch t+1, absent any on-demand proactive epoch control. Other proactive authentication system arrangements may be used in other embodiments.

In step 302, the first cryptographic device adjusts at least one epoch responsive to the received epoch control signal. For example, as noted above, the first cryptographic device may prematurely terminate a current epoch and advance to a subsequent epoch. The subsequent epoch is also referred to as a "new epoch" herein. Again, other types of epoch adjustment may be used in other embodiments.

By way of example, for an embodiment in which the client 104-1 or 204 comprises a hardware authentication token, the epoch control signal may be generated responsive to user activation of the epoch advance input 220.

As another example, for an embodiment in which the client 104-1 or 204 comprises a software authentication token, the epoch control signal may be received by the token in the form of a digitally-signed message jointly produced by the n servers one of which comprises the second cryptographic device. As a more particular illustration, a software token in a mobile phone can receive such a digitally-signed message in an application push message, an SMS messages, etc.

The two foregoing examples should not be viewed as being exclusive to hardware and software authentication tokens, respectively. Techniques described herein in the context of hardware authentication tokens may be adapted for use in software authentication tokens, and vice-versa. For example, a hardware authentication token with a wireless communication interface may be adapted to receive a digitally-signed message jointly produced by the n servers as described above.

The digitally-signed message referred to above may indicate a current epoch t and may be rejected by the first cryptographic device if the message is not received within the current epoch. Thus, on receiving the message during epoch t, the first cryptographic device advances to epoch t+1. Otherwise, it rejects the message.

The digitally-signed message may be produced utilizing a signing key that is held by the servers in a standard threshold format. An example of such a threshold format is described in V. Shoup, "Practical threshold signatures," Advances in Cryptology—EUROCRYPT 2000, Vol. 1807 of Lecture Notes in Computer Science, pp. 207-220, 2000, which is incorporated by reference herein.

The signing of the message can be performed using a public key or a symmetric key. In the public-key case, a single epoch update message may be distributed to multiple clients, which verify its validity with respect to a corresponding public key. In the symmetric-key case, servers may employ message authentication code (MAC) keys. Either type of signing key itself can be proactively updated, possibly in an on-demand manner. However, an update notice should be transmitted from the servers to the client. Notice of a transition to epoch t+1 may be digitally signed with the key for epoch t.

In the symmetric-key case, the servers can verify a successful advance by a client from epoch t to epoch t+1 by determining to which epoch the client outputs (e.g., passcodes) correspond, i.e., whether the current key state of the client is $\kappa_t$ or $\kappa_{t+1}$. In the public-key case, the servers may receive a signed key update to verify an epoch update of a client, or may rely on a forward-secure public key technique that requires no such signed update.

As indicated above, in conjunction with the epoch adjustment of step 302, the first cryptographic device may provide an update notice or other indication of the adjusted epoch to the second cryptographic device, for example, in a digitally-signed message. This indication can be embedded in a passcode or can be transmitted via an out-of-band communication mechanism, when one is available, with suitable integrity and confidentiality protections. Other types of epoch adjustment indications may be provided.

In step 304, refreshed secret information associated with the new epoch is utilized to authenticate the first cryptographic device to at least a second cryptographic device. More particularly, based on the above-noted assumptions, the client 104-1 or 204 authenticates itself to multiple servers 102 or 202.

Figure 3:
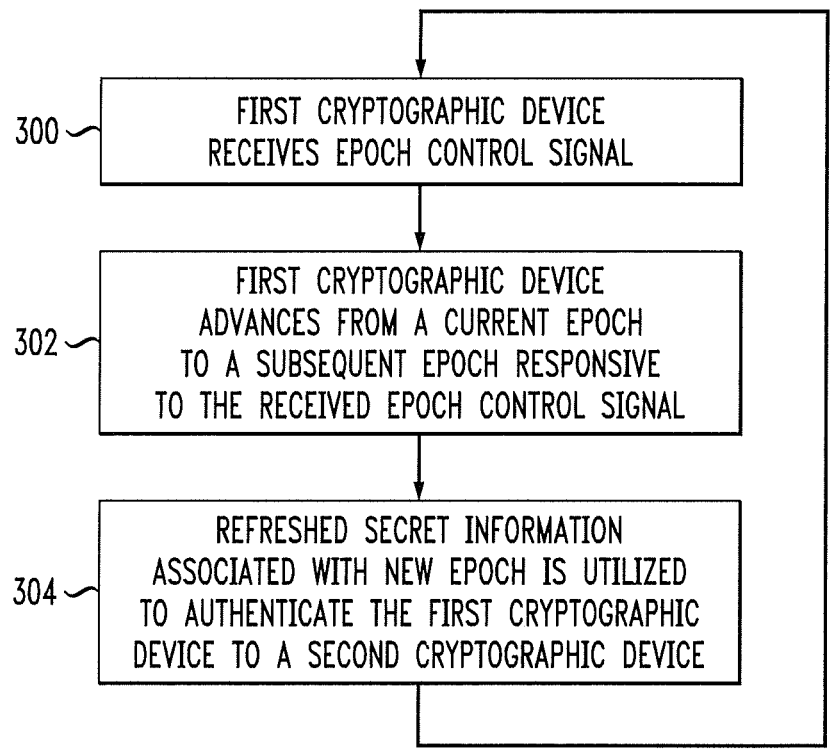
FIG. 3 is a flow diagram of on-demand proactivation process implemented in the system of FIG. 1 or FIG. 2.

The particular processing operations and other system functionality described in conjunction with the flow diagram of FIG. 3 are presented by way of illustrative example only, and should not be construed as limiting the scope of the invention in any way. Alternative embodiments can use other types of processing operations for on-demand proactivation. For example, the ordering of the process steps may be varied in other embodiments, or certain steps may be performed concurrently with one another rather than serially. Also, the process steps may be repeated periodically.

Proactivization of authentication tokens or other types of clients can be selective, meaning that a subset of the population of clients can be selected for updates, or the entire population may be updated over time in batches.

The disclosed techniques may be adapted for use in an authentication system in which a client authenticates to a set of servers using public key cryptography. For example, the client may authenticate using a private key $sk_t$ with corresponding public key $pk_t$ held by the servers. An update in such an embodiment may simply involve the client generating and signing a new public key $pk_t+1$ using its old private key $sk_t$, and transmitting this signed key update to the servers, possibly with previous signed updates. Forward-secure digital signature techniques may be employed, in which case no signed key update would be needed. See, e.g, M. Bellare and S. K. Miner, "A forward-secure digital signature scheme," Advances in Cryptology—CRYPTO'99, Vol. 1666 of Lecture Notes in Computer Science, p. 786, 1999, which is incorporated by reference herein.

It is to be appreciated that on-demand proactivation functionality such as that described in conjunction with the flow diagram of FIG. 3 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1-3 can provide a number of significant advantages relative to conventional practice. For example, these embodiments provide authentication techniques that allow improved epoch control for hardware and software authentication tokens and other types of cryptographic devices in the presence of detected breaches or other security issues.

Authentication techniques of the type described above in conjunction with FIGS. 1-3 may be implemented in a wide variety of different applications. Two additional exemplary communication system applications that may incorporate on-demand proactivation will now be described with reference to FIGS. 4 and 5.

Figure 4:
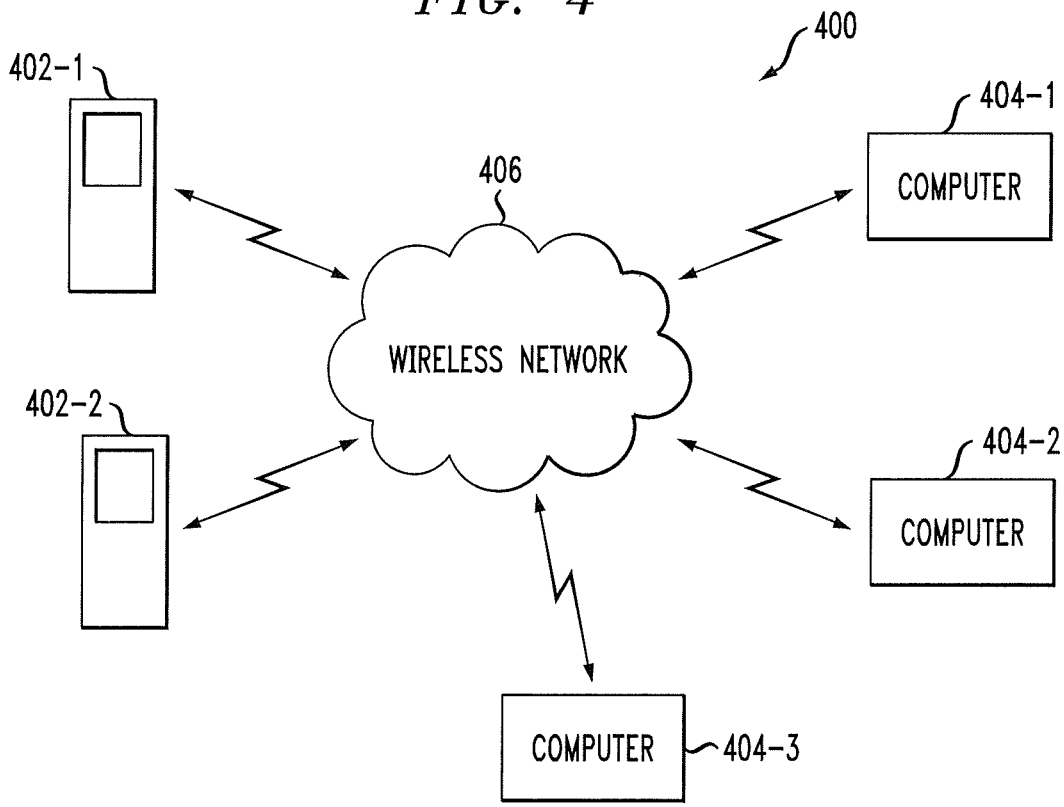
FIGS. 4 and 5 show exemplary embodiments of other communication systems that may incorporate on-demand proactivation functionality of the type illustrated in FIG. 3.

Referring initially to FIG. 4, a communication system 400 comprises a plurality of mobile telephones 402-1 and 402-2 and computers 404-1, 404-2 and 404-3, configured to communicate with one another over a network 404.

Any two or more of the devices 402 and 404 may correspond to respective first and second cryptographic devices configured to implement on-demand proactivation as previously described.

Figure 5:
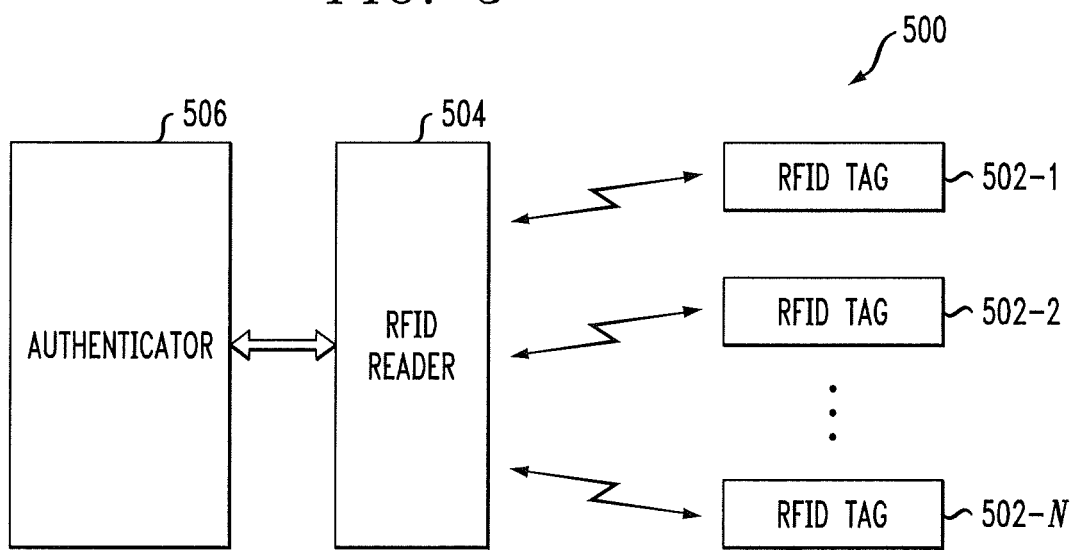

FIG. 5 shows another exemplary communication system 500 in an illustrative embodiment of the invention. In this embodiment, the system 500 is an RFID system comprising RFID tags 502-1, 502-2, . . . 502-N, a reader 504, and an authenticator 506. One or more of the RFID tags 502 may correspond to the first cryptographic device, and the reader 504, possibly in combination with the authenticator 506, may correspond to the second cryptographic device. The authenticator 506 may represent, for example, a back-end authentication server configured to authenticate secret values supplied to it by one or more of the RFID tags 502 via the reader 504. The system 500 may be configured such that epochs for authentication of one or more of the RFID tags 502 are adjustable responsive to epoch control signals from the reader 504 or authenticator 506.

It is to be appreciated that the techniques disclosed herein can be implemented in numerous other applications.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from on-demand proactivation. Also, the particular configuration of system and device elements shown in FIGS. 1, 2, 4 and 5, and the on-demand proactivation process shown in FIG. 3, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
receiving an epoch control signal in a first cryptographic device, the first cryptographic device being configured to store secret information that is refreshed in each of a plurality of epochs; and
adjusting at least one epoch of the first cryptographic device responsive to the received epoch control signal prior to a time at which the first cryptographic device would otherwise advance from a current one of the epochs to a subsequent one of the epochs;
wherein refreshed secret information associated with an adjusted epoch is utilized to authenticate the first cryptographic device to at least a second cryptographic device, the second cryptographic device and one or more additional cryptographic devices storing respective portions of the secret information in a distributed manner.

2. The method of claim 1 wherein the step of receiving an epoch control signal comprises receiving an epoch advance signal directing that the first cryptographic device advance from the current one of the epochs to the subsequent one of the epochs.

3. The method of claim 1 wherein the step of adjusting an epoch of the first cryptographic device responsive to the received epoch control signal comprises terminating the current one of the plurality of epochs and advancing to the subsequent one of the plurality of epochs.

4. The method of claim 1 wherein the first cryptographic device comprises an authentication token and the second cryptographic device comprises an authentication server.

5. The method of claim 4 wherein the authentication token comprises a hardware authentication token.

6. The method of claim 5 wherein the step of receiving an epoch control signal comprising receiving the epoch control signal responsive to activation of an epoch control input mechanism of the hardware authentication token.

7. The method of claim 6 wherein the epoch control input mechanism of the hardware authentication token comprises a designated user input button of the hardware authentication token.

8. The method of claim 6 wherein the hardware authentication token is configured to recognize only a single activation of the epoch control input mechanism within a specified period of time.

9. The method of claim 1 wherein the authentication token comprises a software authentication token.

10. The method of claim 1 wherein the epoch control signal is received in the form of a digitally-signed message jointly produced by a plurality of servers one of which comprises the second cryptographic device and others of which comprise respective ones of the additional cryptographic devices.

11. The method of claim 10 wherein the digitally-signed message indicates the current one of the epochs and further wherein the message is rejected by the first cryptographic device if the message is not received within the current epoch.

12. The method of claim 10 wherein the digitally-signed message is produced utilizing a signing key that is held by the servers in a standard threshold format.

13. The method of claim 10 wherein the digitally-signed message is produced utilizing one of a symmetric signing key and a public key.

14. The method of claim 1 further comprising the step of providing an indication of the adjusted epoch to the second cryptographic device in a digitally-signed message.

15. A computer program product comprising a non-transitory processor-readable storage medium having embodied therein one or more software programs, wherein the one or more software programs when executed by a processor cause the steps of the method of claim 1 to be performed.

16. An apparatus comprising:
a first cryptographic device comprising a processor coupled to a memory;
the first cryptographic device being configured to store in the memory secret information that is refreshed in each of a plurality of epochs under control of the processor;
wherein the first cryptographic device is further configured to receive an epoch control signal, and to adjust at least one epoch responsive to the received epoch control signal prior to a time at which the first cryptographic device would otherwise advance from a current one of the epochs to a subsequent one of the epochs; and
wherein refreshed secret information associated with an adjusted epoch is utilized to authenticate the first cryptographic device to at least a second cryptographic device, the second cryptographic device and one or more additional cryptographic devices storing respective portions of the secret information in a distributed manner.

17. The apparatus of claim 16 wherein the first cryptographic device comprises an authentication token and the second cryptographic device comprises an authentication server.

18. The apparatus of claim 17 wherein the authentication token comprises a hardware authentication token.

19. The apparatus of claim 18 wherein the epoch control signal is received responsive to activation of an epoch control input mechanism of the hardware authentication token.

20. The apparatus of claim 16 wherein the epoch control signal is received in the form of a digitally-signed message jointly produced by a plurality of servers one of which comprises the second cryptographic device and others of which comprise respective ones of the additional cryptographic devices.

\* \* \* \* \*